US00RE44904E

(19) United States
(12) Reissued Patent
Karhula

(10) Patent Number: US RE44,904 E
(45) Date of Reissued Patent: May 20, 2014

(54) METHOD FOR CONTENTION FREE TRAFFIC DETECTION

(75) Inventor: Petri Karhula, Tampere (FI)

(73) Assignee: Calton Research L.L.C., Wilmington, DE (US)

(21) Appl. No.: 13/171,882

(22) Filed: Jun. 29, 2011

Related U.S. Patent Documents

Reissue of:
(64) Patent No.: 7,555,014
Issued: Jun. 30, 2009
Appl. No.: 11/402,621
Filed: Apr. 11, 2006

U.S. Applications:
(63) Continuation of application No. 10/167,986, filed on Jun. 11, 2002, now Pat. No. 7,027,465, which is a continuation of application No. PCT/EP99/10097, filed on Dec. 17, 1999.

(51) Int. Cl.
*H04J 3/07* (2006.01)

(52) U.S. Cl.
USPC ..... 370/506; 370/350

(58) Field of Classification Search
USPC ..... 370/350, 503–506
See application file for complete search history.

(56) References Cited

U.S. PATENT DOCUMENTS

| | | | | |
|---|---|---|---|---|
| 4,627,051 | A | 12/1986 | Shimizu | |
| 4,716,407 | A | 12/1987 | Borras et al. | |
| 4,930,124 | A | 5/1990 | de Boisseron et al. | |
| 5,541,919 | A * | 7/1996 | Yong et al. | 370/416 |
| 5,594,738 | A | 1/1997 | Crisler et al. | |
| 5,675,617 | A | 10/1997 | Quirk et al. | |
| 5,678,188 | A | 10/1997 | Hisamura | |
| 5,682,386 | A * | 10/1997 | Arimilli et al. | 370/468 |
| 5,822,361 | A | 10/1998 | Nakamura et al. | |
| 5,857,092 | A | 1/1999 | Nakamura et al. | |
| 5,881,242 | A | 3/1999 | Ku et al. | |
| 6,347,087 | B1 * | 2/2002 | Ganesh et al. | 370/392 |
| 6,633,564 | B1 * | 10/2003 | Steer et al. | 370/389 |
| 6,658,363 | B2 | 12/2003 | Mejia et al. | |
| 7,027,465 | B2 | 4/2006 | Hautala | |

FOREIGN PATENT DOCUMENTS

| | | |
|---|---|---|
| EP | 0491494 | 6/1992 |
| EP | 0584667 | 3/1994 |
| EP | 0749254 | 12/1996 |

(Continued)

OTHER PUBLICATIONS

R.O. Lamaire et al.; "Wireless LANs and Mobile Networking: Standards and Future Directions"; IEEE communications Magazine 'Online!'; Aug. 1996; p. 1-15.

(Continued)

*Primary Examiner* — Phuc Tran
(74) *Attorney, Agent, or Firm* — Stolowitz Ford Cowger LLP

(57) ABSTRACT

The invention discloses a method for detecting priority of data frames comprising the steps of extracting (S1) a bit pattern from a predetermined position in a frame, comparing (S2, S3) said extracted bit pattern with a search pattern, and identifying (S4) said received frame as a priority frame in case said extracted bit pattern (BP) matches with said first search pattern (SP). By this method, the priority of a data frame can easily be detected. The invention also proposes a corresponding device for detecting priority of data frames.

18 Claims, 10 Drawing Sheets

(56) References Cited

FOREIGN PATENT DOCUMENTS

| | | |
|---|---|---|
| EP | 0782297 | 7/1997 |
| EP | 0804006 | 10/1997 |
| EP | 0917317 | 5/1999 |
| EP | 0959398 | 11/1999 |
| WO | 01045328 | 6/2001 |

OTHER PUBLICATIONS

European Patent Office; International Search Report WO01045328; Apr. 4, 2001; 7 pages.

Stolowitz Ford Cowger LLP; Related Case Listing; Aug. 24, 2011, 1 Page.

* cited by examiner

METHOD FOR CONTENTION FREE TRAFFIC DETECTION

Matter enclosed in heavy brackets [ ] appears in the original patent but forms no part of this reissue specification; matter printed in italics indicates the additions made by reissue.

CROSS-REFERENCE TO RELATED APPLICATIONS

This application *is a reissue of U.S. patent application Ser. No. 11/402,621, filed on Apr. 11, 2006, issued as U.S. Pat. No. 7,555,014, which* is a continuation of U.S. patent application Ser. No. 10/167,986, filed Jun. 11, 2002, now U.S. Pat. No. 7,027,465, which is a continuation of International Application PCT/EP99/10097 having an international filing date of Dec. 17, 1999 and from which priority is claimed under all applicable sections of Title 35 of the United States Code including, but not limited to, Sections 120, 363 and 365(c).

FIELD OF THE INVENTION

The present invention relates to a method and a device for detecting priority of data frames in a network.

BACKGROUND OF THE INVENTION

This invention relates in general to the field of telecommunications, more precisely to Wireless Local Area Networks (WLAN) and Electrical and Electronics Engineers (IEEE) 802.11 WLAN standard.

The IEEE 802.11 Wireless Local Area Network specification specifies a so-called Contention Free Period (CFP), which is a period of transmission time that is free from the normal contention based airtime reservation. The length and duration of CFP are configurable parameters in Access Point (AP), so that the start of CFP is repeated after one or more Delivery Traffic Indication Message (DTIM) intervals (see IEEE 802.11 standard). The CFP and its relationship to the so-called Content Period (CP) is schematically illustrated in FIG. 12. As can be seen, a CFP repetition interval contains a Content Free Period (CFP) and a Content Period (CP). Each CFP begins with a beacon frame that contains a DTIM element.

The purpose of this CFP is that it can be used for delivering high priority traffic, which has higher real time requirements than normal traffic. The CFP is controlled by the so-called Point Coordination Function (PCF) in an Access Point (AP). The standard specifies the PCF operation in basic level, but does not specify how the PCF should be controlled or how some traffic should be identified as high priority traffic. These things are considered to be out of the scope of the standard.

Information within data frames is marked as having a high priority by using certain fields in some protocol frames or headers. However, the Access Point (AP) usually processes only frames on the Medium Access Control (MAC) layer such that the AP can not easily access information regarding the priority of certain data blocks within the frames, since this information is processed in higher layers.

Thus, for getting priority information, conventionally the frames which are to be transmitted through an Access Point (AP) had to be searched for these fields which indicate the priority state of the actual data frame. This means that in all frames all fields had to be checked, all the headers had to be analyzed, starting from the outer most headers, until the right field in the header had been found.

Since all frame headers are parsed when detecting priority, this measure has a high reliability.

However, this measure is very complex, takes a long time and requires a large amount of processing. Furthermore, the traffic transferred in WLAN can be practically anything, including complex tunneling protocols. Therefore, all the frame headers and protocols which can be included in the data frames transmitted via the network have to be known. Hence, the amount of information needed for identifying the data is huge. This huge amount of information is typically too heavy to handle in quite small and low price equipment like WLAN access points (AP).

In addition, it has to be considered that every time new protocols are introduced, the access point has to be updated, at least by software updates. This is also required in case protocols already used are changed.

Thus, conventionally such a transmission differentiation based on priority was not conducted at all. That is, the existing systems according to the IEEE 802.11 standard do not separate traffic based on priority. In these conventional systems, the Content Free Period (CFP) is only used to deliver traffic from the Access Point (AP) to stations, treating all frames equally.

SUMMARY OF THE INVENTION

Therefore, the object underlying the invention resides in removing the above drawbacks of the prior art and to provide a method by which priority traffic can easily be distinguished from normal traffic without the need of a complex processing.

This object is solved by a method for detecting priority of data frames in a network comprising the steps of extracting a bit pattern from a predetermined position in a frame, comparing the extracted bit pattern with a search pattern, and identifying the received frame as a priority frame in case the extracted bit pattern matches with the first search pattern.

Alternatively, the above object is solved by a device for detecting priority of data frames in a network comprising a receiving means for receiving data frames, an extracting means for extracting a bit pattern from a predetermined position of a data frame, a comparing means for comparing the extracted bit pattern with a predetermined search pattern, and an identifying means for identifying the received frame as a priority frame in case the extracted bit pattern matches with the first search pattern.

Thus, a priority which is defined in a higher-level layer can easily be detected by comparing a corresponding bit pattern with a search pattern without further processing of the received frame. By the method and the device according to the invention, simply a bit pattern is extracted at a position in the frame, where the priority information is known to be located. This bit pattern is compared with a search pattern which corresponds to that bit pattern, which would be located at the above position in case that a priority is set for the actual frame. Thus, it is not necessary to process and analyze the received frame, i.e., to process higher-level layers in order to obtain priority information.

Hence, when adopting the IEEE 802.11 WLAN standard, the priority can be detected in the Medium Access Control (MAC) layer which is a low-level layer. That is, the method can easily find higher priority traffic from the stream of MAC layer frames. Therefore, the method does not need any knowledge of the upper layer protocols.

Consequently, according to the method of the invention, certain traffic can be defined to have higher priority than other traffic when it is handled in an IEEE 802.11 WLAN Access Point (AP). The method is designed so that it is as lightweight as possible to execute in a low cost and possibly low performance AP.

Furthermore, the method is protocol-independent and so flexible that all the configuration may be done in external configuration program and the Access Point does not need to know anything about the processed traffic.

Further advantageous developments are set out below.

In particular, the predetermined position in the frame is defined by the offset of the bit pattern in the frame. Thus, the position of the bit pattern to be extracted and examined can accurately be defined.

Furthermore, the offset and the search pattern are included in an information element. This information element can be produced by an external program such that the device according to the invention and the device performing the method according to the invention does not have to generate the search pattern and the offset. Thus, the structure of the device does not have to be complex.

In addition, in case new protocols or modified protocols are introduced in the network, it is not necessary to reconfigure the network element (i.e., the device) performing the method. It is only necessary to provide new information elements including the new offset and the new search pattern, which can be effected by an external configuration program. For this, it is not necessary to install new software in the network element or to install new hardware. It is not even necessary to shut down the network element for a new configuration. Hence, the method is very flexible.

Moreover, the bit pattern can be masked by using a mask. Then, the masked bit pattern is compared with the search pattern instead of comparing the bit pattern with the search pattern. By this measure, single bits can easily be extracted from the bit pattern. This is advantageous in case the bit pattern is extracted in form of bytes. For example, a bit pattern can include two bytes, whereas for the priority detection only two bits of each byte are required. These two bits can easily be extracted by using the mask.

The mask can also be included in the information element described above.

If necessary, also a plurality of different bit patterns, search patterns, offsets and—optionally—masks can be used to detect priority of the frames. By this measure, priority information can be detected which is located at different positions within a data frame.

Alternatively, a plurality of different priority levels can be provided for the frames. For detecting different priority levels, a plurality of different bit patterns, search patterns, offsets and—optionally—masks can be used to detect the plurality of different priority levels. By this measure, also different priority levels can easily be detected.

Hence, a plurality of different information elements can be used. For example, one certain priority can require a plurality of information elements, while another certain priority can require only one particular information element.

A received frame can be forwarded to a priority queue in case the frame is detected to be a priority frame during a special period for sending priority traffic. The priority queue serves to transmit the data priority frames in the network faster than normal frames. This measure is especially advantageous in an IEEE 802.11 WLAN since in this standard, a Contention Free Period is defined, as described above.

In addition, the duration of the special period for sending priority traffic can be adjusted according statistical information regarding the priority frames sent. Thus, the special period, i.e., the Contention Free Period, can be adjusted corresponding to the load of priority traffic on the network.

Furthermore, for obtaining the statistical information, the total number of priority frames and the number of priority frames outside the special period can be counted. Then, it can be decided on the basis of the count values obtained whether the special period has to be increased or decreased.

In addition, in the IEEE 802.11, a data+CF-poll frame is defined. Preferably, this data+CF-poll frame can be used for transmitting priority frames in case of a symmetrical high priority traffic between the Access Point and stations in the network.

Furthermore, the invention proposes a method for generating priority detecting information necessary for the above method and device. This method comprises the steps of analyzing a data frame, identifying a bit pattern indicating a priority state, defining the identified bit pattern as a search pattern, and locating the bit pattern within the data frame. By this method, the necessary priority detection information can easily be provided. For example, this method can be employed by a configuration program that is externally run, for example, in one of the wireless stations which are connected by air with the Access Point.

The above method for generating priority detecting information may further comprise the steps of determining the offset of the location, and producing an information element including the offset and the search pattern. Optionally, also the mask for masking the bit pattern mentioned above can be determined and included in the information element.

BRIEF DESCRIPTION OF THE DRAWINGS

The present invention will be more readily understood with reference to the accompanying drawings in which.

DETAILED DESCRIPTION OF PREFERRED EMBODIMENTS

In the following, preferred embodiments of the invention are described in more detail with reference to the accompanying drawings.

Figure 1:
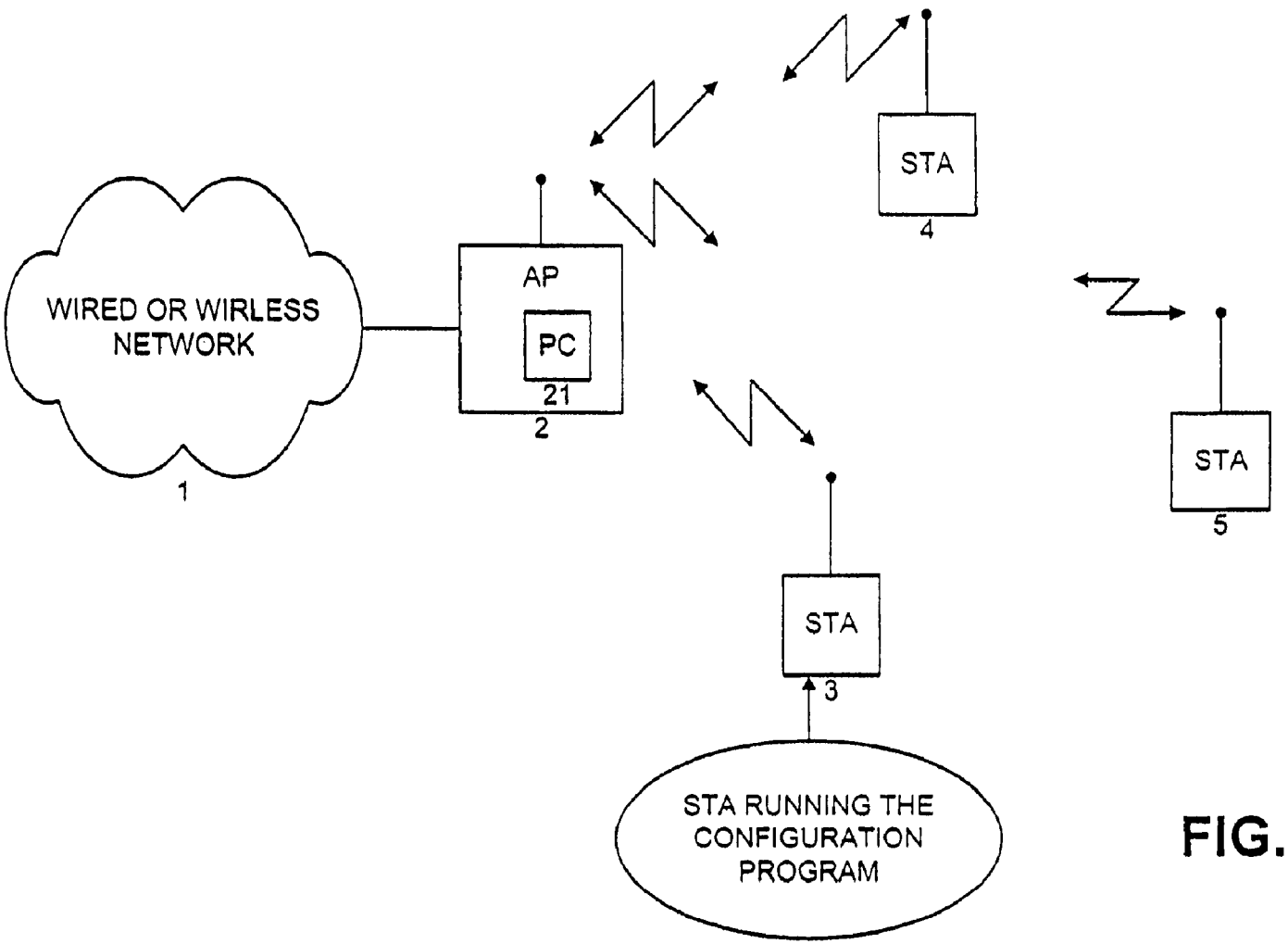
FIG. 1 shows a main system overview.

FIG. 1 shows an overview of the main system used in the embodiments. The system is a normal IEEE 802.11 Basic Service Set (BSS) containing one Access point (AP) 2 and one or more wireless stations (STA) 3 to 5. The AP may or may not be connected to another wired or wireless network 1. The purpose of the AP 2 is to transmit the traffic between the wireless stations or between wireless stations and the network 1 which is connected to the AP 2.

All the network components function according to the IEEE 802.11 standard. This presented set-up is a typical representation of the coverage area of one AP. The whole wireless network usually consists of several of these kinds of subsystems. An external configuration program may run in one of the stations in the wireless network or it may reside in some other host and be connected to AP with a wire. In this example, the configuration program is executed in the wireless station 3.

In the following, a first embodiment which shows the basic idea of the invention is described with respect to the flow chart shown in FIG. 2 and an example for a Medium Access Control (MAC) layer frame shown in FIG. 3.

Figure 2:
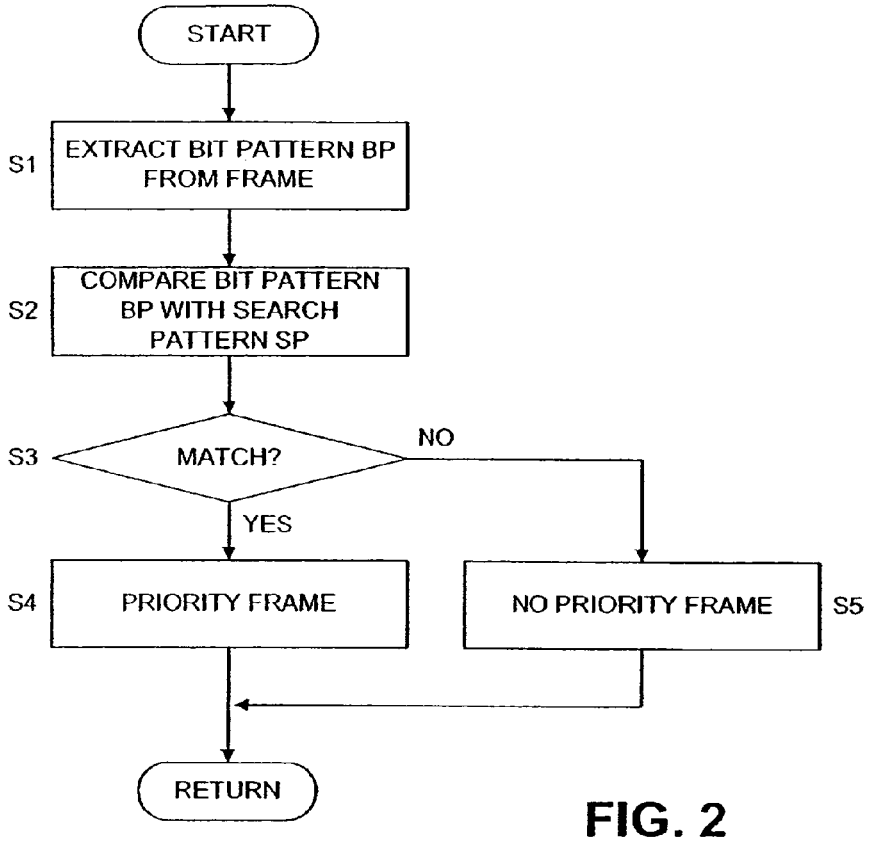
FIG. 2 shows a process for checking priority of frames according to a first embodiment.

The procedure shown in FIG. 2 is executed by the Access Point AP 2 every time a Medium Access Control (MAC) layer frame has been received.

In step S1, the AP 2 extracts a bit pattern from a given position in the received frame. The bit pattern can be a pattern of two bytes, for example. However, the length of the bit pattern can be selected arbitrarily. The extracted bit pattern is indicated by BP in FIG. 2. In step S2, the extracted bit pattern BP is compared with a predetermined search pattern SP. If in step S3 it is decided that both patterns match, it is determined in step S4 that the actual frame is a priority frame. On the other hand, if it is decided in step S3 that both patterns do not match, it is determined in step S5 that the actual frame is not a priority frame. After identifying the priority of the frame, the frame can be treated according to the identified priority.

Thus, the frame can easily be examined whether it is a priority frame or not without the need for analyzing the data format in the MAC layer frame itself, i.e., without knowing protocols of the higher layers.

Figure 3:
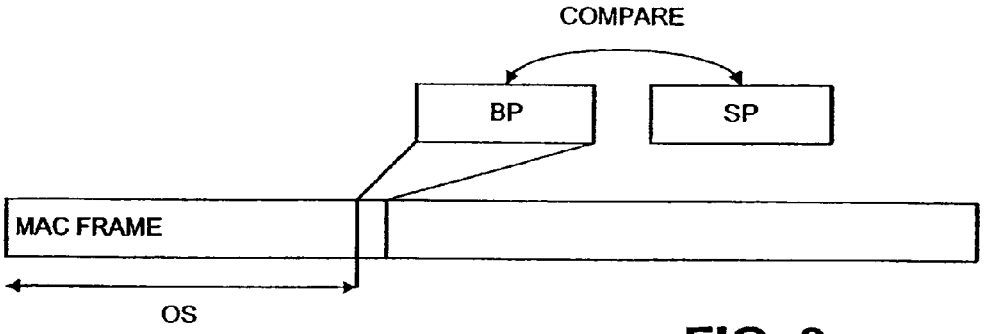
FIG. 3 shows an example for a frame to be examined by the process according to the first embodiment.

The position of the bit pattern to be extracted is defined by the offset OS from the start of the MAC frame, as shown in FIG. 3. Thus, the AP 2 requires only information regarding the offset OS and the search pattern SP for checking priority of certain MAC frames.

This information can be provided by an external configuration program. The configuration program can be executed in one of the wireless stations, for example. Alternatively, it can be executed in any suitable network element, including the Access Point itself. For this configuration program it is necessary that the bit positions of the priority information which are usually set in higher layers are known. Thus, by providing the AP with the offset, the AP does not have to process the frame in order to identify priority information. It is only necessary to obtain the corresponding bit pattern.

In the first embodiment, the configuration program is executed in the wireless station STA 3. The configuration program produces information elements which contain the above-described information regarding the offset OS and the search pattern SP necessary to identify the priority state of certain MAC frames. These information elements are transmitted to the AP 2.

Figure 4:
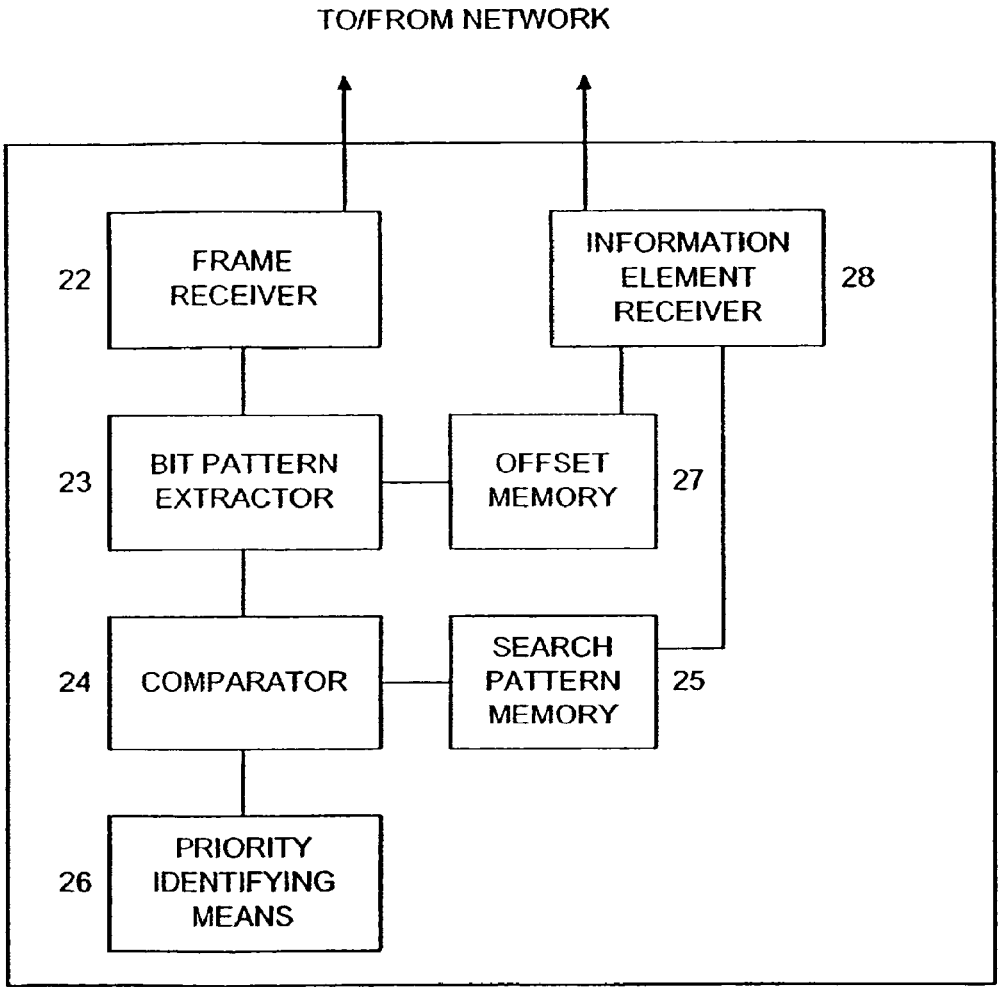
FIG. 4 shows a frame priority detecting device according to the first embodiment.

FIG. 4 shows the relevant parts of the Access Point 2 in more detail. Reference numeral 22 denotes a frame receiver by which frames are received from the wired or wireless network 1 and also from the wireless stations 2 to 5. Reference numeral 23 denotes a bit pattern extractor by which the bit pattern BP described above is extracted from a predetermined position. The position is defined by the offset OS, as mentioned above, and the offset is stored in an offset memory 27 which is accessed by the bit pattern extractor 23. The extracted bit pattern BP is forwarded to a comparator 24 which compares the extracted bit pattern BP with the search pattern SP. The search pattern SP is stored in a search pattern memory 25 which is accessed by the comparator 24. The comparison result is supplied to a priority identifying means 26 which identifies the actual frame F as a priority frame in case the comparison results indicates that the bit pattern BP matches the search pattern SP. Thus, the Access Point (AP) 2 can detect priority frames and can treat them correspondingly.

As mentioned above, the external configuration program provides information elements which each comprise an offset OS and a search pattern SP. These information elements are received by an information element receiver 28. The receiver 28 analyzes the information element and supplies the detected offset OS to the offset memory 27 and the detected search pattern SP to the search pattern memory 25.

The first embodiment described above illustrates the basic operation according to the invention. The second embodiment described in the following describes a further, more detailed example for the high priority traffic detection method in which the Content Free Period (CFP) defined in IEEE 802.11 standard is used for transmitting detected high priority frames.

Figure 12:
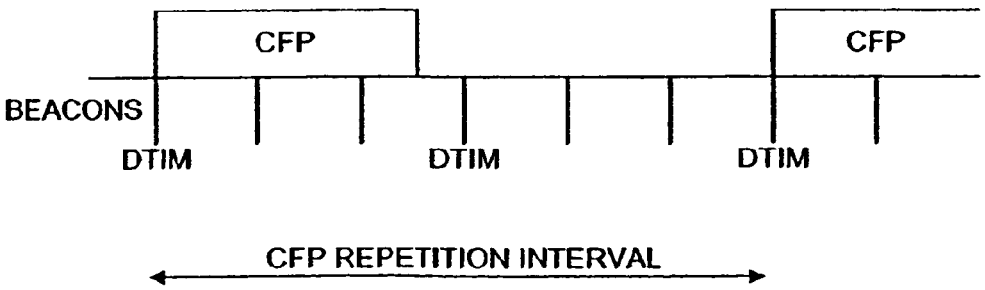
FIG. 12 illustrates the relationship between Content Free Periods (CFP) and Content Periods (CP) according to IEEE 802.11.

According to IEEE 802.11, the Content Free Period (CFP) is a period which is reserved for transmitting high priority traffic, as described above in the introductory part with respect to FIG. 12. The CFP is controlled by a Point Coordinator (PC) 21 which is arranged in the Access Point (AP) 2 shown in FIG. 1. If the high priority traffic is transferred only from the AP 1 to the wireless stations (i.e., in a typical client-server application case), the CFP may be used only for delivering data from the AP to wireless stations. But, if the nature of the high priority traffic is interactive (like a videoconference, for example), the PC 21 must also poll wireless stations to permit them to transmit also during the CFP. See IEEE 802.11 standard for more detailed description about this basic functionality of IEEE 802.11 standard.

The AP 2 receives MAC layer frames either from the wireless station or from the connected wired network. If the destination of the frame is in the wireless network, the AP will check whether the frame is high or normal priority traffic. The priority detection requires that the AP 2 is configured with the external configuration program to detect the priority and the required configuration information elements are configured to the AP by the external configuration program. The AP also needs to reformat the MAC level header of the frame or encapsulate the frame inside a separate IEEE 802.11 MAC header which is defined in IEEE 802.11. The point when the priority detection check is performed (before or after IEEE 802.11 MAC header formatting) can be left implementation specific.

If the BSS is in a so-called Contention Free (CF) state (i.e., currently there is a Contention Free Period (CFP)) and the frame is a priority frame, the frame is put in a priority transmit queue, otherwise the frame is treated like the normal traffic. During the CFP, all the frames in the priority queue are transmitted before any frames from the normal queue. When the CFP ends, remaining frames in the priority queue are moved to the normal queue and priority queue is flushed.

According to this embodiment, the priority of a MAC layer frame is detected by using one or more information elements which are transmitted to the Access Point (AP) 1. That is, one or more bit patterns with corresponding different offsets are checked whether they match with one or more different search patterns. Furthermore, the bit patterns extracted from the MAC layer frame are also masked by using a mask. The mask is also contained in an information element. Thus, the information element according to the second embodiment comprises the offset and the search pattern as according to the first embodiment, and in addition a mask. The mask serves to obtain only particular bits in the extracted bit pattern and is optional.

Figure 5:
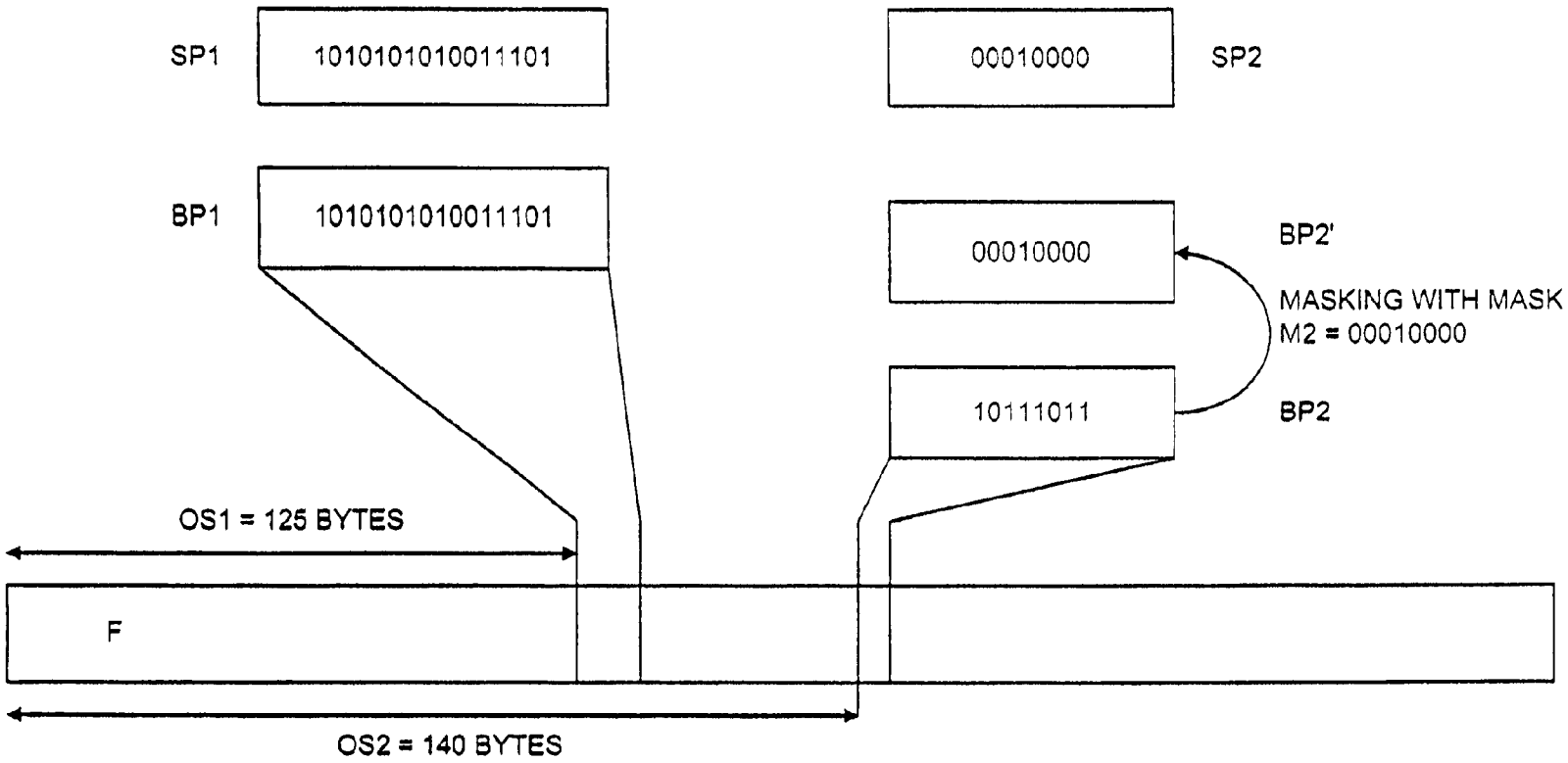
FIG. 5 shows an example of pattern matching with two different information elements according to a second embodiment.
Figure 6:
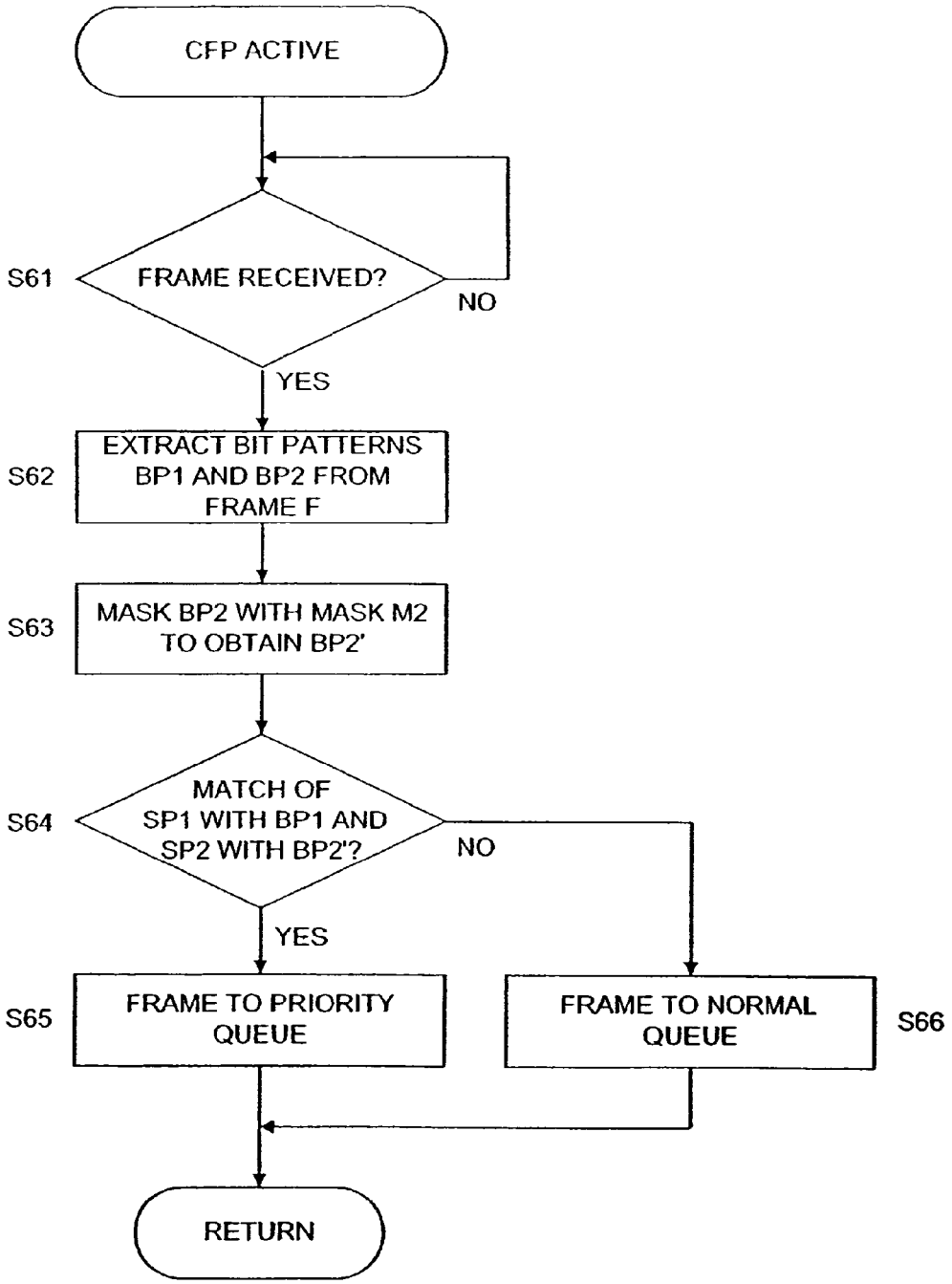
FIG. 6 illustrates a flow chart of a frame sending procedure during Content Free Period (CFP) according to the second embodiment.

The operation according to the second embodiment is described by referring to FIGS. 5 and 6. It is noted that for simplifying the illustration, the second embodiment is described with reference to the case that the priority is detected by using two information elements.

In FIG. 5 it is shown that two bit patterns BP1 and BP2 are extracted from the MAC layer frame F. The first bit pattern BP1 is extracted with an offset OS1. As illustrated, the first bit pattern matches with the first search pattern SP1. For the first bit pattern BP1, no mask has been specified (i.e., no masking is performed).

However, for the second bit pattern BP1 a mask M2 is specified. In this example, the mask is M2=00010000 such that only the fourth bit is passed through. The resultant bit pattern BP2' is then compared with the second search pattern SP2. Here, the second search pattern SP2 and the masked bit pattern BP2' match. Since also the first search pattern SP1 matches with the first bit pattern BP1, it is decided that the actual frame F is a high priority frame.

According to the second embodiment, the frame F which has been detected as a priority frame, is transmitted in the Contention Free Period (CFP). That is, it is put on a high priority queue. This process is described in the following by referring to the flow chart shown in FIG. 6.

The process shown in this flow chart is performed during the Content Free Period, i.e., in case the CFP is active. In step S61, the Access Point (AP) 2 waits for receiving a frame which is to be transmitted further to the wireless stations 3 to 5 (FIG. 1). In step S62, the bit patterns BP1 and BP2 are extracted from the frame F, as shown in FIG. 5. In step S63, the bit pattern BP2 is masked with the mask M2 to obtain a bit pattern BP2', as described above. Since no mask has been specified for the first bit pattern BP1, no corresponding step for the first bit pattern BP1 is performed.

Then, in step S64, it is checked whether both bit patterns BP1 and BP2' match with the search patterns SP1 and SP2, respectively. If SP1 and BP1, and SP2 and BP2' respectively match, it is decided that the received frame F is a high priority frame, and the frame F is put in the priority queue (step S65). This is effected by the Point Coordinator (PC) 21 arranged in the Access Point (AP) 2. If the patterns do not match (NO in step S64), the received frame F is put in the normal queue, as shown in step S66.

As described above, the Point Coordinator (PC) 21 puts a priority frame in the priority queue in case the Contention Free Period (CFP) is active. However, in case the CFP is inactive, the frame goes to the normal queue so that it does not have to wait for the CFP to start. When the CFP starts, the PC flushes the normal queue and places the unsent high priority frames in the priority queue. Thus, when the Point Coordinator (PC) 21 notices that the frame which should be sent is a high priority frame, it puts this frame in the normal or high priority queue depending on the current state of the network.

As mentioned above, the use of two information elements is only an example. The number of information elements can be more than two. By using a plurality of information elements, it is also possible to distinguish between different priority levels. For example, the configuration program can give the following data to the Access Point by which three priorities (i.e. priority 1, priority 2 and priority 3) can be distinguished. It is noted that these three priorities can each represent different priority levels (e.g., priority 1 represents the highest priority while priority 3 has the lowest) or can represent equal priority levels.

Priority 1 information:
Information element 1: offset 1 and search pattern 1
Information element 2: offset 2 and search pattern 2
Information element 3: offset 3 and search pattern 3 . . .
Information element n: offset n and search pattern n
Priority 2 information:
Information element 1: offset 1 and search pattern 1
Priority 3 information:
Information element 1: offset 1 and search pattern 1
Information element 2: offset 2 and search pattern 2

The AP then checks whether a received frame matches with all the information elements of the first group containing the information elements for priority 1. That is, for each information element it is checked whether a bit pattern at the offset included in the information element matches with the search pattern included in the information element. If this is the case for all information elements, then the frame has the priority 1.

If the frame does not match with all information elements listed in the first group, then the AP tests the same frame with all the information elements (one, in this example) of the second group containing the information elements for priority 2. If the bit pattern extracted at the offset 3 in the frame matches with the search pattern 3 included in information element 3, it is decided that the frame has the priority 2.

However, if the patterns do not match, then the AP checks the priority 3 information. That is, the frame is checked whether it matches with information elements 1 and 2. If this is the case, the frame has the priority 3. If the frame still does not match, it has no priority.

Next, a third embodiment is described, according to which the Point Coordinator (PC) 21 collects statistics about the high priority traffic sent and adjusts the parameters for the CFP.

In detail, the PC 21 counts the high priority packets during the every so-called Delivery Traffic Indication Message (DTIM) interval (see IEEE 802.11 WLAN standard). Furthermore, it also counts how much of those packets are transmitted outside the CFP and how much during the DTIM interval containing CFP but outside CFP. The PC saves statistics of the previous N DTIM intervals, where N is at least the CFP repeating interval. The PC then checks the statistics after every DTIM interval that contains CFP and adjusts the CFP length and interval accordingly. The frame handling and statistics collection during the CFP is presented in FIG. 8 and during the contention period in FIG. 9.

Figure 7:
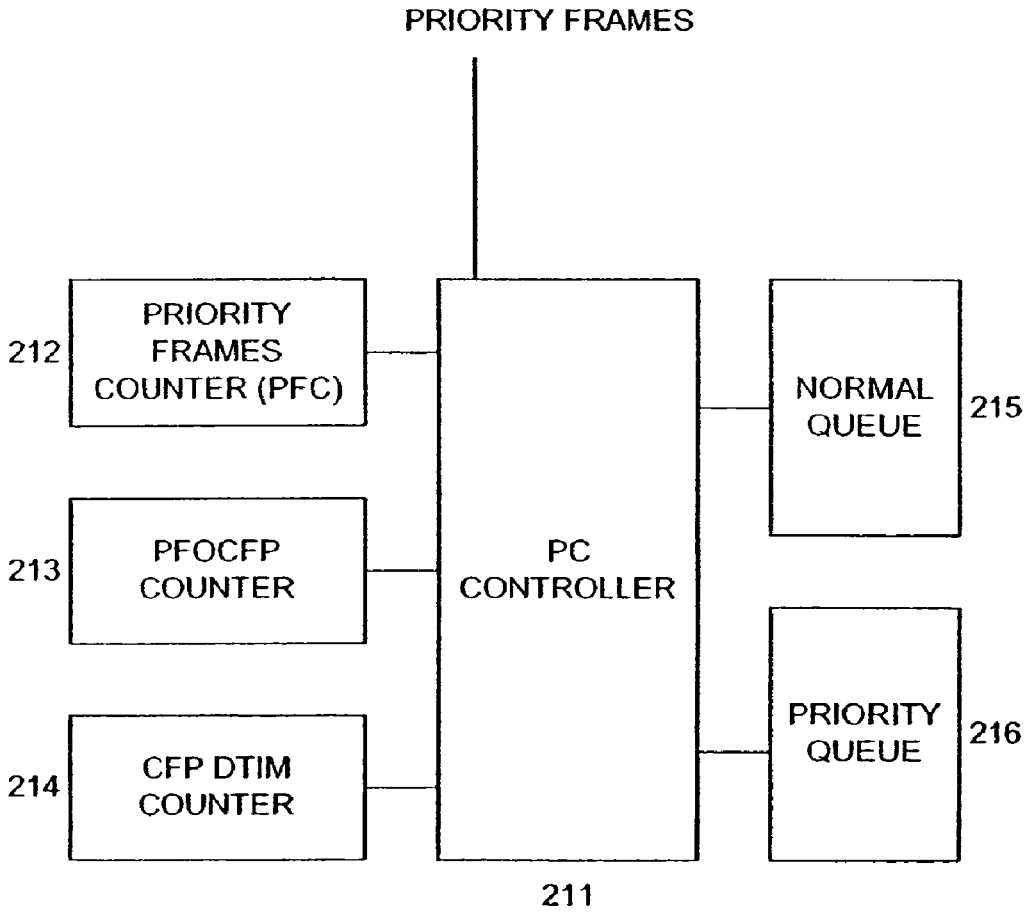
FIG. 7 shows relevant parts of a Point Coordinator (PC) according to a third embodiment.

The PC 21 according to the third embodiment is shown in FIG. 7 in greater detail. As derivable therefrom, the PC comprises a plurality of counters which are used by a PC controller 211 to control the CPF. A priority frames counter (PFC) 212 serves to count all priority frames received. A counter for priority frames outside CFP (PFOCFP) counter 213 serves to count all priority frames which are received during the content period, i.e., when CFP is inactive. A CFP DTIM counter 214 serves to count all priority frames which are received in an DTIM interval containing a Contention Free Period (CFP). As mentioned above, the PC 21 forwards the received priority frames either to the normal queue 215 or to the priority queue 216 depending on the current state of the network.

Figure 8:
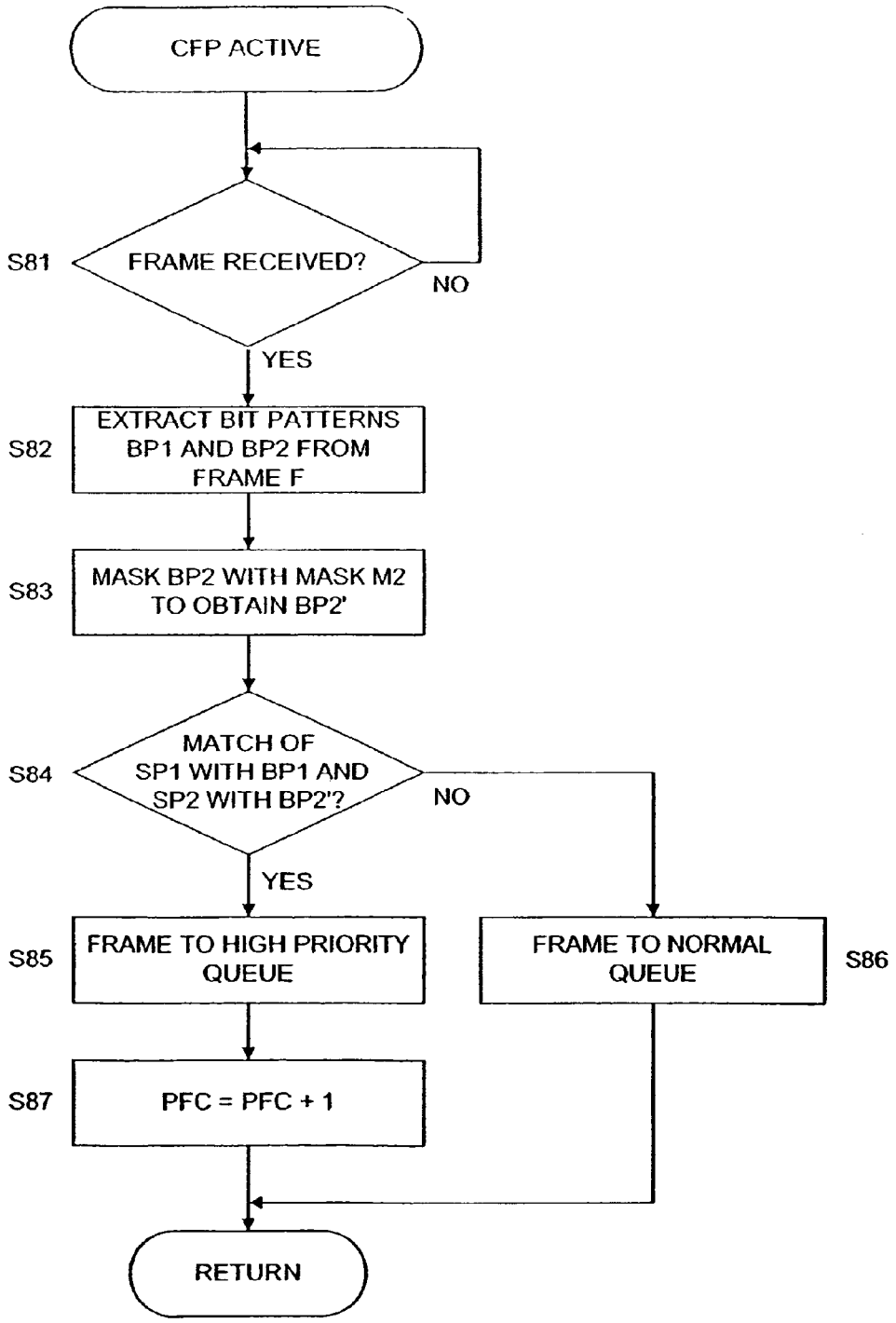
FIG. 8 illustrates a flow chart of a frame sending procedure during Content Free Period (CFP) according to the third embodiment.

The flowchart shown in FIG. 8 is almost the same as in FIG. 6. The steps S81 to S86 correspond to the steps S61 to S66 of FIG. 5. Thus, an unnecessary repetition is omitted here. However, in addition to the flow chart shown in FIG. 6, a new step S87 is performed in case patterns SP1 and BP1, and SP2 and BP2' match. In this step S8, the priority frame counter (PFC) 212 is incremented each time it is decided that an actual frame is a high priority frame.

Figure 9:
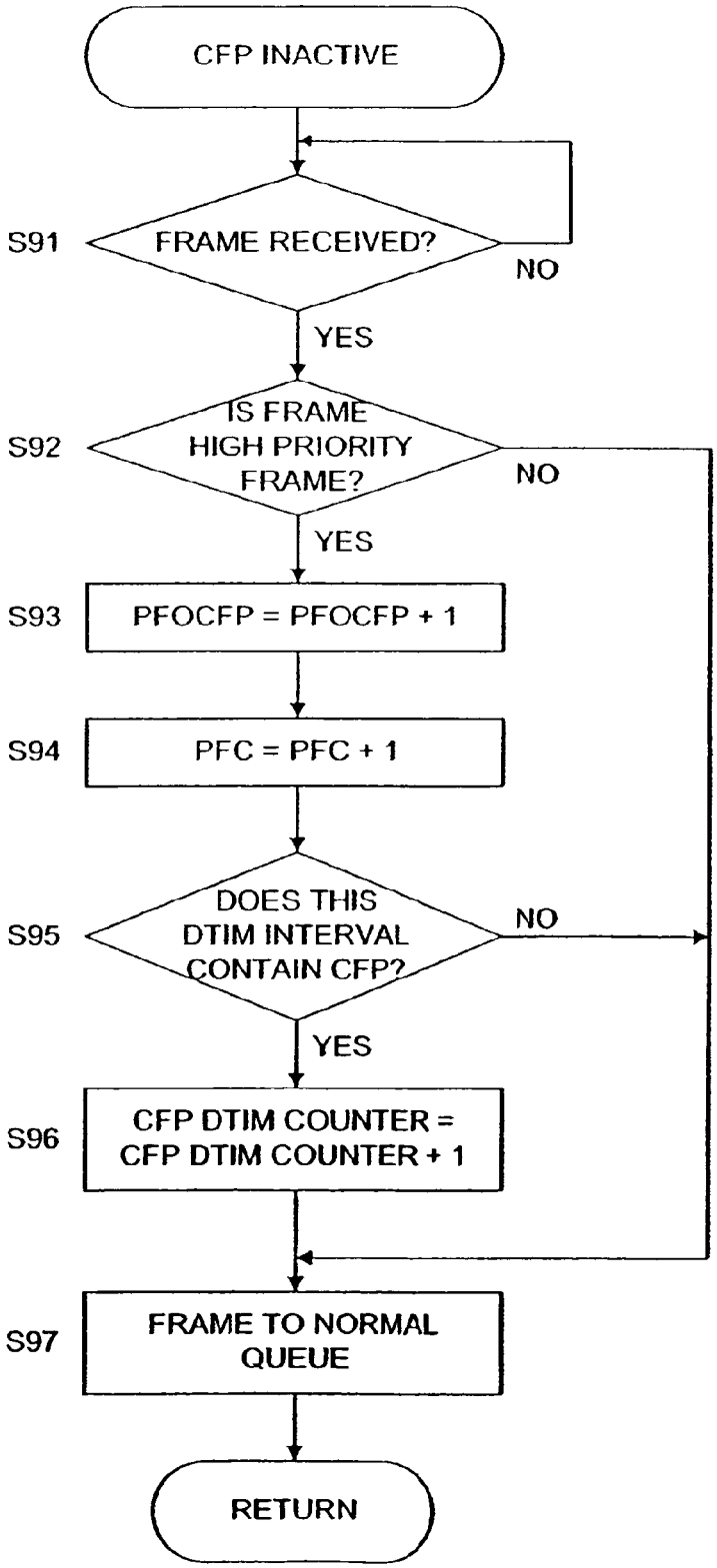
FIG. 9 illustrates a flow chart of a frame sending procedure during contention period according to the third embodiment.

FIG. 9 shows a flowchart representing a process performed during the content period, i.e., when the CFP is inactive. Here, all received frames are put in the normal queue. In case of a high priority frame, several values are counted by the counters of the Point Coordinator (PC) 21 for providing statistical information.

In detail, in step S91 it is waited for a frame, similar to step S81 of FIG. 8. In step S92, the priority is detected in the way as described in the first or second embodiment. If the actual frame is a normal frame with no priority, the flow advances to step S97 in which the frame is put to the normal queue 215. If, however, the actual frame is a priority frame, the flow advances to step S93 in which PFOCFP counter 213 is incremented. Furthermore, in step S94 also the priority frames counter 212 is incremented.

In step S95 it is checked whether the actual DTIM interval contains a Content Free Period (CFP). If this DTIM interval contains a CFP, the CFP DTIM counter 214 is incremented in step S96 before the flow advances to step S97. Otherwise, the flow advances directly to step S97. Thereafter, the routine is ended.

The statistical information regarding the priority frames are used as described in the following with reference to FIG. 10.

Figure 10:
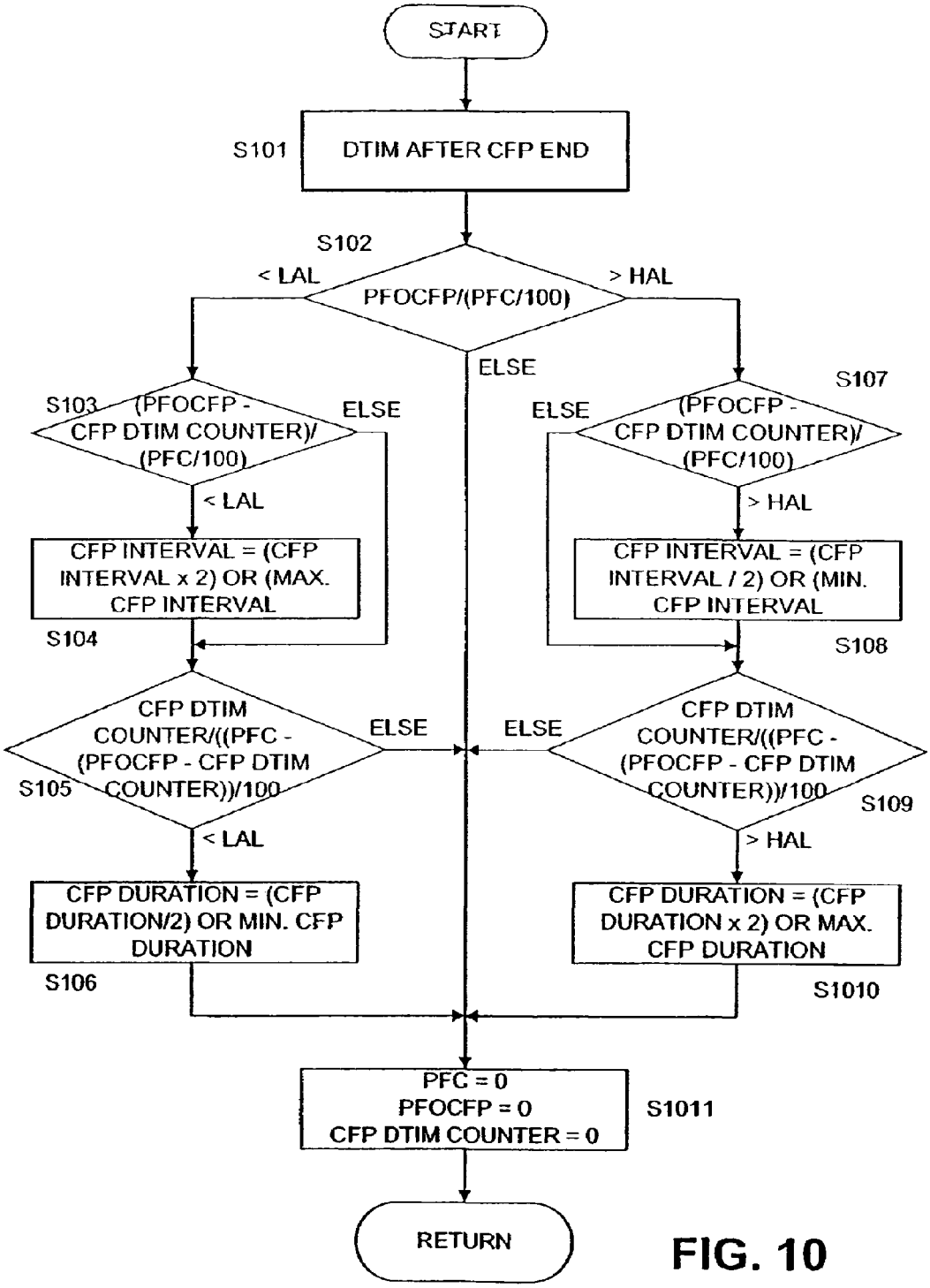
FIG. 10 illustrates a flow chart of a procedure for CFP parameter tuning according to the third embodiment.

As shown in FIG. 10, the procedure is started in an DTIM interval after the end of the Content Free Period (step S101). In step S102, the percentage of priority frames sent outside of the CFP is checked. Depending on the result, different processes are executed, as described next.

If the percentage of high priority traffic sent outside of CFP is higher than a certain high alarm level HAL, the PC 21 will start corrective actions. These processes are illustrated on the right side of the flow chart shown in FIG. 10.

The alarm level is 100%—percentage of the high priority traffic that must be send inside the CFP in any case. For example, if it is known that the traffic which requires an almost real-time treatment requires a priority traffic of 30%, the alarm level is set to 70%. The alarm level can be fixed or it can be dynamically adjustable.

When the alarm level HAL is reached, the PC will next check the percentage of high priority traffic sent during the DTIM intervals not containing the CFP. This is effected in step S107 in which the difference between the count values of the PFOCFP counter 213 and the CFP DTIM counter 214 is calculated, wherein the difference is brought in relation to the value of the priority frames counter (PFC) 212. If it is more than the alarm level HAL, the PC will make the CFP interval to be half of the original (if it is not already one DTIM interval), as described in step S108.

Next, in step S109, the PC 21 will check if the percentage of high priority traffic sent outside of the CFP during the DTIM intervals containing CFP is also higher than the alarm level. This percentage P is calculated as follows:

$$\text{CFP DTIM counter}/(\text{PFC}-(\text{PFOCFP}-\text{CFP DTIM counter}))/100)$$

If this percentage is higher than the alarm level, the PC 21 will double the duration of the CFP (if not already maximum possible) in step S1010. The alarm level used in the different steps may be the same or different according to the wanted system behavior.

If it is decided in step S102 that the percentage of high priority traffic sent outside the CFP drops below a low alarm level LAL, the PC 21 will start decreasing the CFP in order to give the normal traffic also a reasonable chance to be delivered in time. The low alarm level LAL is the percentage of the high priority traffic that can be send outside the CFP if needed. In order that the system can work smoothly, the low alarm level should be less than 100%—high alarm level HAL.

When the alarm level LAL is reached, the PC 21 will next check what is the percentage of high priority traffic sent during the DTIM intervals not containing the CFP in step S103 which corresponds to step S107 described above. If it is less than alarm level, the PC will make the CFP interval to be double of the original in step S104. Next, the PC 21 will check if the percentage of high priority traffic sent outside of the CFP during the DTIM containing CFP is also lower than the alarm level LAL. This is effected in step S105 which corresponds to step S109 described above. If this percentage is lower as the alarm level LAL, the PC 21 decreases the duration of the CFP with the amount of the previous addition in step S106. The alarm level LAL used in the different steps may be the same or different according to the wanted system behavior.

If it is decided in step S102 that the percentage of priority frames outside the Content Free Period (i.e., the count value of the PFOCFP counter 213 with respect to the count value of the priority frame counter 212) is between the low alarm level LAL and the high alarm level HAL, the flow advances directly to step S1011 in which all counters 212, 213 and 214 are reset. Then, the procedure is ended.

Next, a fourth embodiment is described. The structure and procedures according to this embodiment is similar to the embodiments described above. However, in this embodiment the nature of the high priority traffic is checked. In particular, it is considered whether the high priority traffic is symmetrical, i.e., whether the high priority traffic from a wireless station to the Access Point (AP) 2 is the same or almost the same as the high priority traffic from the AP 2 to the wireless station.

During the Content Free Period (CFP) the wireless stations (terminals) are not allowed to transmit unless the PC 21 polls them. Therefore, they will register themselves to PC to be placed in a polling list. In order to get the best benefit from this traffic control, wireless stations in the WLAN must be able to identify the high priority traffic and send that traffic during the CFP.

In case of the symmetrical high priority traffic between the AP 2 and the wireless stations, the configuration information (from the external configuration program) contains a field telling that this is symmetrical high priority traffic. When the Point Coordinator (PC) 21 in the AP 2 detects that the high priority traffic is symmetrical and the receiving station is pollable during the Content Free Period (i.e., is CF-pollable), it will send it to the terminal inside a so-called data+CF-poll frame instead of normal data frame during the CFP. The data+CF-poll frame is a special data frame, defined in the IEEE 802.11 standard, that allows the receiving station send one data frame during the CFP after receiving the data +CF-poll frame. During the contention period, the symmetrical traffic does not cause any special processes. The use of data+CF-poll frame enables equal high priority data delivering performance to both directions.

The PC 21 must ensure that other wireless stations in the polling list gets polled according to the standard even when delivering symmetrical high priority traffic.

In the following, the configuration program used for generating priority detection information used in the above embodiments is described in more detail.

Figure 11:
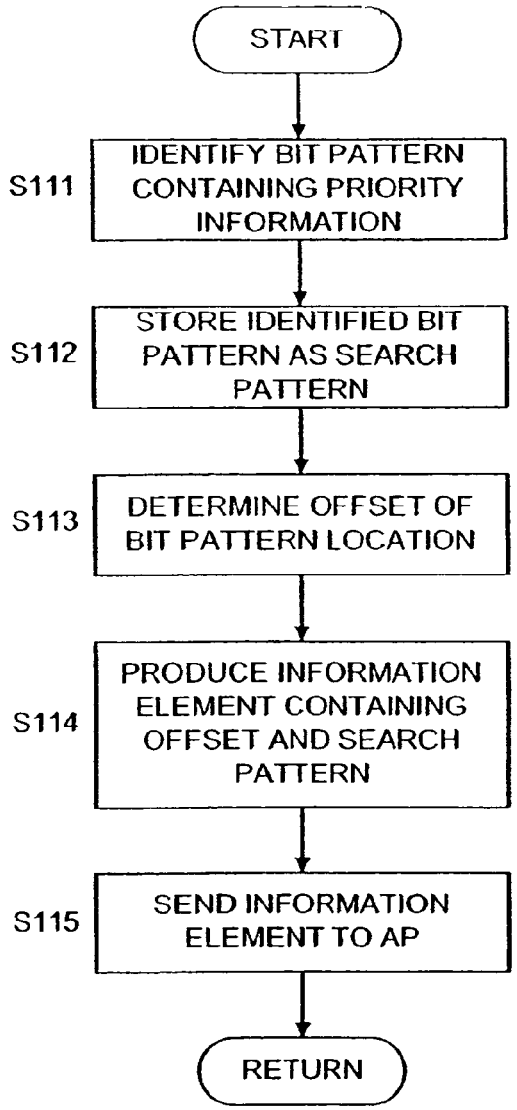
FIG. 11 shows a flow chart of a method for obtaining priority detection information.

The method adopted in the configuration program is described by referring to the flowchart shown in FIG. 11.

In step S111, a bit pattern (consisting, for example, of one or two bytes) which indicates the priority information is identified in the data frame. The identified bit pattern is defined as the search pattern (SP) in step S112. In step S113, the location, that is, the offset of the identified bit pattern (i.e., the search pattern) inside the data frame is determined. Thereafter, an information element containing the determined offset and the identified search pattern is produced in step S114. Finally, in step S115 the information element is sent to the Access Point and the routine ends.

In a similar way, also the optional mask (as used in the second embodiment) can be obtained. Therefore, an additional step is required which is performed after the bit pattern identifying step S112 such that the mask is defined. It is also possible to produce a plurality of information elements, as used in the second and third embodiment, also by taking into account a plurality of different priority levels.

Next, an example is described in which frames (containing IP packets) to be sent to a particular IP-adress should have high priority. In this case, the identification of the search patterns and the location of the search patterns can be performed as follows: The configuration program knows that the offset to the destination IP-address from the beginning of the IP packet (as an example for a data frame) is 32 bytes and the offset from the beginning of the ethernet (version 2) frame to beginning of the IP packet is 14 bytes. Thus, the actual offset of the IP-address is 46 bytes. The search pattern is the IP-address in question. Thus, the necessary information for an information element can easily be extracted.

In other cases, it might be necessary that the configuration program analyzes frames in order to obtain the relevant information.

The location for performing the above method within the network can be arbitrarily chosen. It may be located in some station in the wireless network, it may be centralized in a place in the wired network, or it may be connected to the AP with a separate cable. In some cases, the configuration program may also be run in the AP, but in this way the benefit of the configuration program being external will be lost.

Preferably, the location where the above method, i.e., the external configuration program can be performed is in one of the wireless stations 2 to 5. In this way, the program can also "snoop" the traffic and check whether the traffic is correctly recognized by the AP, that is, whether the high priority traffic is correctly treated. This is because in the wireless stations, the data sent with the frames are processed and, thus, it is clear whether a received frame is a priority frame or not.

When placed in the WLAN, the configuration program can also make corrections to the AP configurations (i.e., the information elements sent to the AP) based on a traffic monitoring in the WLAN. The configuration program can be run in some notebook PC in WLAN, for example.

In rather large networks, however, the best place for the configuration program is in the wired network, where all the access points of the network can be controlled with a single configuration program.

The above description and accompanying drawings only illustrate the present invention by way of example. Thus, the embodiments of the invention may vary within the scope of the attached claims. For example, the embodiments can be arbitrarily combined.

In particular it has to be noted that the above description of the embodiment has been made basically with respect to the IEEE 802.11 WLAN standard. However, it has to be noted that this is only an example and that it is to be understood that the invention can also be applied to other suitable network situations.

Furthermore, in the above embodiments it was basically distinguished between priority frames and normal frames, i.e., between frames with priority and frames without priority. However, it is also possible to distinguish between a plurality of different priority levels. For example, the second embodiment can be modified such that the two bit patterns are used to distinguish between three different priority levels (no priority—medium priority—high priority). Also, different masks for one bit pattern can be used to distinguish between different priority levels.

The invention claimed is:

1. A method comprising extracting a bit pattern from a predetermined position in a frame[,];

comparing said extracted bit pattern with a search pattern[,];

identifying a received frame as a priority frame in case said extracted bit pattern matches with said search pattern[,];

forwarding said received frame to a high priority queue in case said frame is detected to be a high priority frame during a special period for sending priority traffic[,]; and adjusting the duration of the special period for sending priority traffic according statistic information regarding sent priority frames.

2. The method according to claim 1, further comprising counting the total number of priority frames;

counting the number of priority frames outside said special period; and deciding whether said special period has to be increased or decreased on the basis of the count values obtained in said counting steps.

3. A device comprising a receiver configured to receive data frames;

an [exracter] *extracter* configured to extract a bit pattern from a predetermined position of a data frame;

a comparator configured to compare said extracted bit pattern with a predetermined search pattern; and an identifier configured to identify said received frame as a priority frame in case said extracted bit pattern matches with said first search pattern, wherein a controller is configured to forward said received frame to a high priority queue in case said frame is detected to be a high priority frame during a special period for sending priority traffic, and said controller is configured to adjust the duration of the special period for sending priority traffic according to statistical information regarding sent priority frames.

4. The device according to claim 3, wherein said controller, in order to obtain said statistic information, is configured to access a priority frames counter for counting the total number of priority frames and a counter for counting priority frames outside said special period, said controller configured to decide whether said special period has to be increased or decreased on the basis of the count values obtained in said counting.

5. A device comprising means for extracting a bit pattern from a predetermined position in a frame[,];

means for comparing said extracted bit pattern with a search pattern[,];

means for identifying a received frame as a priority frame in case said extracted bit pattern matches with said search pattern[, and];

means for forwarding said received frame to a high priority queue in case said frame is detected to be a high priority frame during a special period for sending priority traffic[.]; and means for adjusting the duration of the special period for sending priority traffic according statistic information regarding sent priority frames.

6. A memory having a program stored thereon for execution in a device by carrying out the method of claim 1.

*7. A method comprising:*

*detecting a received frame is a priority frame based, at least in part, on information in the received frame, including extracting a bit pattern from a predetermined position in the received frame and comparing the extracted bit pattern with a search pattern, and wherein the detecting is based on a match between the extracted bit pattern and the search pattern;*

*transmitting the received frame in a transmit period reserved for priority frames in response to the detecting; and*

*adjusting a duration of the transmit period reserved for priority frames based on statistic information regarding sent priority frames.*

*8. The method of claim 7, further comprising forwarding the received frame to a priority queue for transmission in the transmit period reserved for priority frames.*

*9. The method of claim 8, further comprising forwarding the received frame from the priority queue to a normal queue for transmission outside of the transmit period reserved for priority frames in response to an expiration of the transmit period reserved for priority frames.*

*10. A method comprising:*

*detecting a received frame is a priority frame based, at least in part, on information in the received frame;*

*transmitting the received frame in a transmit period reserved for priority frames in response to the detecting;*

*adjusting a duration of the transmit period reserved for priority frames based on statistic information regarding sent priority frames; and*

*forwarding the received frame to a normal queue for transmission outside of the transmit period reserved for priority frames when the transmit period reserved for priority frames is unavailable.*

*11. A method comprising:*

*detecting a received frame is a priority frame based, at least in part, on information in the received frame;*

*transmitting the received frame in a transmit period reserved for priority frames in response to the detecting;*

*adjusting a duration of the transmit period reserved for priority frames based on statistic information regarding sent priority frames; and*

*counting a total number of priority frames; and*

*counting a number of the priority frames transmitted outside of the transmit period reserved for priority frames, wherein the adjusting of the transmit period is based on a ratio of number of the priority frames transmitted outside of the transmit period reserved for priority frames and the total number of priority frames.*

*12. A method comprising:*

*detecting a received frame is a priority frame based, at least in part, on information in the received frame;*

*transmitting the received frame in a transmit period reserved for priority frames in response to the detecting;*

*adjusting a duration of the transmit period reserved for priority frames based on statistic information regarding sent priority frames,*

*wherein the statistic information regarding sent priority frames is based on a percentage of priority frames transmitted outside of the transmit period reserved for priority frames to a total number of priority frames transmitted.*

*13. A device comprising:*

*a controller to detect a received frame is a priority frame based, at least in part, on information in the received frame; and*

*a priority queue configured to transmit the received frame in a transmit period reserved for priority frames, wherein the controller is configured to adjust a duration of the transmit period reserved for priority frames based on statistic information regarding sent priority frames,*

*wherein the controller is configured to extract a bit pattern from a predetermined position in the received frame, to compare the extracted bit pattern with a search pattern, and to detect a received frame is a priority frame based, at least in part, on a match between the extracted bit pattern and the search pattern.*

*14. The device of claim 13, wherein the controller is configured to forward the received frame to the priority queue for transmission in the transmit period reserved for priority frames.*

*15. The device of claim 13, further comprising a normal queue configured to transmit the received frame outside of the transmit period reserved for priority frames.*

*16. The device of claim 15, wherein the controller is configured to transfer the received frame from the priority queue to the normal queue in response to an expiration of the transmit period reserved for priority frames.*

*17. A device comprising:*

*a controller to detect a received frame is a priority frame based, at least in part, on information in the received frame; and*

*a priority queue configured to transmit the received frame in a transmit period reserved for priority frames, wherein the controller is configured to adjust a duration of the transmit period reserved for priority frames based on statistic information regarding sent priority frames,*

*wherein the controller is configured to count a total number of priority frames, to count a number of the priority frames transmitted outside of the transmit period reserved for priority frames, and to adjust the transmit period reserved for priority frames based on a ratio of number of the priority frames transmitted outside of the transmit period reserved for priority frames and the total number of priority frames.*

*18. A device comprising:*

*a controller to detect a received frame is a priority frame based, at least in part, on information in the received frame; and*

*a priority queue configured to transmit the received frame in a transmit period reserved for priority frames, wherein the controller is configured to adjust a duration of the transmit period reserved for priority frames based on statistic information regarding sent priority frames,*

*wherein the statistic information regarding sent priority frames is based on a percentage of priority frames transmitted outside of the transmit period reserved for priority frames to a total number of priority frames transmitted.*

* * * * *